(12) United States Patent
Gosior et al.

(10) Patent No.: US 7,320,065 B2
(45) Date of Patent: Jan. 15, 2008

(54) MULTITHREAD EMBEDDED PROCESSOR WITH INPUT/OUTPUT CAPABILITY

(75) Inventors: Jason Gosior, Edmonton (CA); Colin Broughton, Edmonton (CA); Phillip Jacobsen, Edmonton (CA); John Sobota, Edmonton (CA)

(73) Assignee: Eleven Engineering Incorporated, Edmonton (CA)

( * ) Notice: Subject to any disclaimer, the term of this patent is extended or adjusted under 35 U.S.C. 154(b) by 203 days.

(21) Appl. No.: 09/843,178

(22) Filed: Apr. 26, 2001

(65) Prior Publication Data

US 2003/0093655 A1    May 15, 2003

(51) Int. Cl.
G06F 9/44    (2006.01)

(52) U.S. Cl. ..................................... 712/227
(58) Field of Classification Search ................. 712/227
See application file for complete search history.

(56) References Cited

U.S. PATENT DOCUMENTS

| | | | |
|---|---|---|---|
| 4,155,115 A * | 5/1979 | Wilske ........................ 700/24 |
| 4,556,951 A * | 12/1985 | Dickman et al. ........... 712/223 |
| 4,594,655 A | 6/1986 | Hao et al. |
| 4,636,942 A | 1/1987 | Chen et al. |
| 4,646,236 A | 2/1987 | Crockett et al. |
| 4,901,230 A | 2/1990 | Chen et al. |
| 4,985,827 A | 1/1991 | Hamanaka et al. |
| 5,276,847 A | 1/1994 | Kohn |
| 5,353,418 A | 10/1994 | Nikhil et al. |
| 5,357,617 A | 10/1994 | Davis et al. |
| 5,404,469 A | 4/1995 | Chung et al. |
| 5,430,850 A | 7/1995 | Papadopoulos et al. |
| 5,471,593 A | 11/1995 | Branigin |
| 5,499,349 A | 3/1996 | Nikhil et al. |
| 5,546,593 A | 8/1996 | Kimura et al. |
| 5,560,029 A | 9/1996 | Papadopoulos et al. |
| 5,632,032 A | 5/1997 | Ault et al. |
| 5,666,535 A | 9/1997 | Komori et al. |
| 5,721,920 A | 2/1998 | Mak et al. |
| 5,734,921 A | 3/1998 | Dapp et al. |
| 5,742,822 A | 4/1998 | Motomura |

(Continued)

FOREIGN PATENT DOCUMENTS

EP    0 697 653 A1    2/1996

(Continued)

OTHER PUBLICATIONS

Tanenbaum, Andrew S. "Structured Computer Organization". Second Edition. Englewood Cliffs, NJ: Prentice-Hall, Inc., © 1984. pp. 10-12.*

(Continued)

*Primary Examiner*—Aimee J. Li
(74) *Attorney, Agent, or Firm*—Donald V. Tomkins

(57) ABSTRACT

An embedded processor system having a single-chip embedded microprocessor with analog and digital electrical interfaces to external systems. A novel processor core uses pipelined execution of multiple independent or dependent concurrent threads, together with supervisory control for monitoring and controlling the processor thread state and access to other components. The pipeline enables simultaneous execution of multiple threads by selectively avoiding memory or peripheral access conflicts through the types of pipeline stages chosen and the use of dual and tri-port memory techniques. The single processor core executes one or multiple instruction streams on multiple data streams in various combinations under the control of single or multiple threads.

20 Claims, 6 Drawing Sheets

U.S. PATENT DOCUMENTS

| | | | |
|---|---|---|---|
| 5,752,067 A | 5/1998 | Wilkinson et al. | |
| 5,754,871 A | 5/1998 | Wilkinson et al. | |
| 5,761,523 A | 6/1998 | Wilkinson et al. | |
| 5,784,552 A * | 7/1998 | Bishop et al. | 714/38 |
| 5,828,894 A | 10/1998 | Wilkinson et al. | |
| 5,835,705 A | 11/1998 | Larsen et al. | |
| 5,845,331 A | 12/1998 | Carter et al. | |
| 5,867,725 A | 2/1999 | Fung et al. | |
| 5,872,963 A | 2/1999 | Bitar et al. | |
| 5,878,241 A | 3/1999 | Wilkinson et al. | |
| 5,903,899 A | 5/1999 | Steele, Jr. | |
| 5,907,702 A | 5/1999 | Flynn et al. | |
| 5,923,872 A | 7/1999 | Chrysos et al. | |
| 5,933,627 A * | 8/1999 | Parady | 712/228 |
| 5,944,816 A | 8/1999 | Dutton et al. | |
| 5,966,528 A | 10/1999 | Wilkinson et al. | |
| 5,968,167 A | 10/1999 | Whittaker et al. | |
| 6,000,044 A | 12/1999 | Chrysos et al. | |
| 6,003,123 A | 12/1999 | Carter et al. | |
| 6,018,759 A | 1/2000 | Doing et al. | |
| 6,052,708 A | 4/2000 | Flynn et al. | |
| 6,073,159 A | 6/2000 | Emer et al. | |
| 6,076,157 A | 6/2000 | Borkenhagen et al. | |
| 6,088,788 A | 7/2000 | Borkenhagen et al. | |
| 6,092,180 A | 7/2000 | Anderson et al. | |
| 6,094,715 A | 7/2000 | Wilkinson et al. | |
| 6,101,569 A | 8/2000 | Miyamoto et al. | |
| 6,105,051 A | 8/2000 | Borkenhagen et al. | |
| 6,105,074 A | 8/2000 | Yokote | |
| 6,105,127 A | 8/2000 | Kimura et al. | |
| 6,134,653 A | 10/2000 | Roy et al. | |
| 6,138,140 A | 10/2000 | Yokote | |
| 6,148,396 A | 11/2000 | Chrysos et al. | |
| 6,154,832 A | 11/2000 | Maupin | |
| 6,163,840 A | 12/2000 | Chrysos et al. | |
| 6,182,210 B1 | 1/2001 | Akkary et al. | |
| 6,195,748 B1 | 2/2001 | Chrysos et al. | |
| 6,272,616 B1 * | 8/2001 | Fernando et al. | 712/20 |
| 6,298,431 B1 * | 10/2001 | Gottlieb | 712/28 |
| 6,341,347 B1 * | 1/2002 | Joy et al. | 712/228 |
| 6,357,016 B1 * | 3/2002 | Rodgers et al. | 713/601 |
| 6,438,671 B1 * | 8/2002 | Doing et al. | 711/173 |

FOREIGN PATENT DOCUMENTS

| | | |
|---|---|---|
| EP | 1091292 A2 * | 4/2001 |
| JP | 63070343 A | 3/1988 |
| JP | 63100539 | 5/1988 |
| JP | 03040034 A | 2/1991 |
| WO | WO-93 02414 A2 | 2/1993 |
| WO | WO9738372 | 10/1997 |
| WO | WO-99 31580 A2 | 6/1999 |
| WO | WO-00 68780 A2 | 11/2000 |
| WO | WO-00 68781 A2 | 11/2000 |

OTHER PUBLICATIONS

Furber, Steve. "ARM System-on-Chip Architecture". Second Edition. Reading, Mass.: Peason Education Limited, © 2000. pp. 19-20, 22-24, 28-32, 216-217, and 271.*

Li, Yamin and Chu, Wanming. "The Effects of STEF in Finely Parallel Multithreaded Processors". IEEE © 1995. pp. 318-325.*

Cavendish, Dirceu. "CORPS—A Pipelined Fair Packet Scheduler for High Speed Switches". IEEE © 2000. pp. 55-64.*

Furber, Steve. "ARM System-on-Chip Architecture". Second Edition. Reading, Mass.: Peason Education Limited, © 2000. pp. 290-293.*

* cited by examiner

FIG. 5

| ADDRESS | READ | WRITE | |
|---|---|---|---|
| 0 | Register R0..R7 | Register R0..R7 | 138 |
| 1 | Program Counter | Program Counter | 136 |
| 2 | Condition Code | Condition Code | 134 |
| 3 | Break Point | Stop | 132 |
| 4 | Wait | SCU Access Pointer | 112 |
| 5 | Semaphore Vector | Up Vector | 109 |
| 6 | RESERVED | Down Vector | 110 |
| 7 | Time | RESERVED | |

118, 120, 122, 124, 126, 128 — left labels; 130 points to Time

FIG. 6

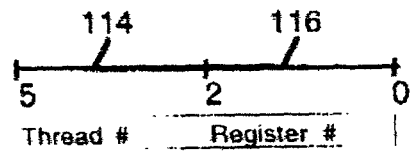

| 15 | | |
|---|---|---|
| Unused | Thread # (114) | Register # (116) |
| | 5   2 | 0 |

FIG. 7

| Address Mode (140) | Description (142) | 1-Word (143) | 2-Word |
|---|---|---|---|
| register | Rn | yes | no |
| register indirect | *Rn | yes | no |
| base displacement | *(Rn+K) | yes | yes |
| PC relative | *(PC+K) | yes | yes |
| absolute | *K | no | yes |
| immediate | K | some | some |

FIG. 8

| Instr | Description | Available Address Modes |
|---|---|---|
| add | 2's complement add | register, immediate |
| and | bitwise and | register, immediate |
| bc | conditional branch | PC relative |
| bic | bit clear | immediate |
| bis | bit set | immediate |
| bix | bit change | immediate |
| bra | unconditional branch | PC relative |
| inp | read input port | immediate |
| ior | bitwise inclusive or | register, immediate |
| jsr | jump to subroutine | register indirect, absolute |
| ld | load from RAM | base displacement, absolute |
| mov | move immediate | immediate |
| outp | write output port | immediate |
| rol | bitwise rotate left | register, immediate |
| st | store to RAM | base displacement, absolute |
| sub | 2's complement subtract | register |
| thrd | get thread number | register |
| xor | bitwise exclusive or | register, immediate |

```
           // Initialize Constants
           SCUptr  0x04           // SCU pointer register
150        SCUpc   0x00           // SCU program counter register
           SCUreg  0x00           // SCU thread register register
           SCUsr   0x03           // SCU stop/run register
      Word
151   Address
         0  // System powers up in SIMD mode with all threads using common code
         0
         1  InitializeThreads:    // ALL THREADS RUNNING
152      1
         1  thrd    r0            // differentiate threads
         2  mov     r2, 0x00      // Initialize register R2 to zero 3  InitMemory:           // write zeros to memory, SIMD Mode
154      3
         3  st      r2, r0, 0x00  // 8-way parallel store to memory
         4  add     r0, r0, 0x08  // move threads to next 8 memory locations
         5  blc     r0, r0, 0x0E  // Check if 16k words initialized by testing bit 14 of word
         6  bc      0x9, Initmemory // if v bit=0, branch back 7  StopThreads:          // stop threads 1 to 7
156      7
         7  mov     r7, 0xFE      // set up mask to only select thread 0
         8  outp    r7, SCUsr     // set SCU stop vector for only thread 0 running 9  InitForMIMD:          // ONLY THREAD ZERO RUNNING
158      9
         9  mov     r5, 0x38      // select SCU pointer value for thread 7 & its register R0
        10  mov     r6, 23        // set pointer to start of MIMD branch table
        12  mov     r7, 0x800     // branch location for thread 7
        14  mov     r0, 0x100     // point thread to its branch location 15  SetMIMD:              // restart threads in MIMD operating mode
160     15
        15  outp    r5, SCUptr    // select thread to change SCU pointer register
        16  outp    r6, SCUpc     // initialize program counters by SCU PC register
        17  outp    r7, SCUreg    // initialize R0 of selected thread to MIMD branch location
        18  sub     r7, r7, 0x100 // pointer to next branch address
        19  sub     r5, r5, 0x08  // shift to next thread value
        20  bc      0x0A, SetMIMD // loop until program counters of thread 7 to 1 initialized
        21  mov     r4, 0x00      // set up SCU mask to select all threads
        22  outp    r4, SCUsr     // set SCU stop vector to run all threads
162
        23  MIMDStart:            // each thread branches to individual independent programs
        23
        23  jsr     r0, r0        // jump to different program for each thread, start MIMD
```

MULTITHREAD EMBEDDED PROCESSOR WITH INPUT/OUTPUT CAPABILITY

BACKGROUND OF THE INVENTION

The invention relates to the field of single-chip embedded microprocessors having analog and digital electrical interfaces to external systems. More particularly, the invention relates to a novel processor core for pipelined execution of multiple independent or dependent concurrent threads, together with supervisory control for monitoring and controlling the processor thread state and access to other components.

"Multithreading" defines a microprocessor's capability to execute different parts of a system program ("threads") simultaneously. Multithreading can be achieved with software or hardware systems. Multithreading with a single processor core can be achieved by dividing the execution time of the processor core so that separate threads execute in segmented time windows, by pipelining multiple concurrent threads, or by running multiple processors in parallel. A microprocessor preferably has the ability to execute a single instruction on multiple data sets ("SIMD") and multiple instructions on multiple data sets ("MIMD").

The field of embedded processors substantially differs from non-embedded processors because embedded processors require 1) low manufacturing cost, 2) low power consumption and low heat dissipation, 3) rigorous real time multi-task execution, and 4) on-chip integration of special purpose and input/output peripherals. Non-embedded processors for server and personal computers maximize processing power and processing throughput and view cost as a secondary consideration. In non-embedded processors, power consumption is less important because non-embedded processors are directly connected to utility power sources and have extensive fin, fan, or refrigeration systems to dissipate large quantities of heat expended during operation. Non-embedded systems typically have a more distributed architecture than embedded processors and have central processor or cluster of processors interconnected to various other input/output, display and storage devices and systems with high speed back-plane structures, local area networks, and telecommunication facilities. Non-embedded processor chip implementations are much more complex than embedded processors and typically contain millions of transistors instead of the several hundred thousand transistors typically used in embedded processors.

Within the field of embedded microprocessors, multitasking to service multiple input/output interfaces and other embedded programs is common. Conventional embedded processors have a single processor that executes one instruction or one task segment comprising a group of instructions. Interrupts allocate the available processor time across multiple competing application tasks. As each new task is prepared for execution in its allocated time segment, the application state or "context" of the last task executed is stored. Real time programs for conventional single processor systems are inherently difficult to design and are inefficient because of the continuous context swapping requirements for such systems.

Various multithread processor systems have been developed. U.S. Pat. No. 5,907,702 to Flynn et al. (1999) described a serial-thread execution system for decreasing thread switch latency in a multithread processor by executing an active thread on the primary instruction queue and by keeping a dormant thread in a secondary queue (with full context storage) for subsequent execution. U.S. Pat. No. 6,134,653 to Roy et al. (2000) described a processor architecture having three sets of general purpose registers to permit rapid context switching between serially-executing program threads. U.S. Pat. No. 5,404,469 to Chung et al. (1995) described a static interleaving technique wherein multiple functional units in a processor were allocated for the execution of an entire instruction from a particular thread in a fixed predetermined time slot in a repeating pattern of predetermined time slots. U.S. Pat. No. 5,546,593 (1996) and U.S. Pat. No. 6,105,127 (2000) to Kimura et al. described a processor architecture for executing multiple instruction streams simultaneously using parallel hardware execution streams and control and prioritization units for selecting and directing each thread to execute in a given stream at a given time.

U.S. Pat. No. 4,646,236 to Crockett et al. (1987) and U.S. Pat. No. 5,357,617 to Davis et al. (1994) described three-stage pipelines. Additionally, various approaches have been proposed to organize the execution of multiple concurrent program threads across multiple non-pipelined processors. U.S. Pat. No. 6,094,715 to Wilkinson et al. (2000), and U.S. Pat. No. 5,966,528 to Wilkinson et al. (1999), and U.S. Pat. No. 5,878,241 to Wilkinson et al. (1999), and U.S. Pat. No. 5,828,894 to Wilkinson et al. (1998), and U.S. Pat. No. 5,761,523 to Wilkinson et al. (1998), and U.S. Pat. No. 5,754,871 to Wilkinson et al. (1998) describe arrays of processors configurable for SIMD, MIMD or a combination of SIMD/MIMD operation. U.S. Pat. No. 5,734,921 to Dapp et al. (1998) describes a parallel array processor or matrix of such processors containing multiple processors that can operate in SIMD, MIMD or combined SIMD/MIMD modes of operation.

Hardware semaphores have been contemplated for memory addresses per U.S. Pat. No. 5,276,847 to Kohn (1994) and for more general system resources as shown in U.S. Pat. No. 6,101,569 to Miyamoto et al. (2000).

Various approaches have been proposed to supervise and control the execution of non-embedded multithread processors. U.S. Pat. No. 5,835,705 to Larsen et al. (1998) described a non-pipelined multithread processor system that counts events per thread and generates an interrupt in response to a count to initiate further action such as performance buffer overflow processing. U.S. Pat. No. 5,923,872 (1999) and U.S. Pat. No. 6,000,044 (1999) to Chrysos et al. described systems for providing samples of detailed state information and instructions in a multiple stage processor pipeline. A profile of such state information per instruction sampled was stored in internal profile registers and later analyzed in response to an interrupt condition or software polling. U.S. Pat. No. 6,018,759 to Doing et al. (2000) and U.S. Pat. No. 6,052,708 to Flynn et al. (2000) described non-pipelined multithreaded processor systems wherein a thread switch controller switched processor threads based upon results from a performance monitoring facility. U.S. Pat. No. 6,073,159 to Emer et al. (2000) described a technique for selecting a preferred thread from a plurality of threads within a simultaneous multithreaded execution computer system. U.S. Pat. No. 6,076,157 to Borkenhagen et al. (2000) described a system for switching between two or more threads of instructions capable of independent execution.

Although different systems have been proposed to provide efficient operation for embedded microprocessor applications, a need exists for a system having enhanced operating capabilities.

SUMMARY OF THE INVENTION

The invention furnishes a programmable, single chip embedded processor system for input/output applications. The invention comprises a modular, multiple bit, multi-thread processor core operable by at least four parallel and independent application threads sharing common execution logic segmented into a multiple stage processor pipeline, wherein the processor core is capable of having at least two states, a logic mechanism engaged with the processor core for executing an instruction set within the processor core, a supervisory control unit controlled by at least one of the processor core threads for examining the core processor state and for controlling the core processor operation, a memory for storing and executing said instruction set data, and a peripheral adaptor engaged with the processor core for transmitting input/output signals to and from the processor core.

BRIEF DESCRIPTION OF THE DRAWINGS

FIG. 5 illustrates up to eight supervisory control registers subject to read and write operations.

FIG. 6 illustrates a representative access pointer.

FIG. 7 illustrates representative address modes.

FIG. 8 illustrates a representative machine instruction set.

FIG. 9 illustrates a representative power up code segment for SIMD/MIMD operation.

DESCRIPTION OF THE PREFERRED EMBODIMENTS

The invention provides a platform for sampling, supervising and controlling the execution of multiple threads within a pipeline processor. The invention provides a powerful mechanism to direct and restrict the operation of multiple concurrent threads competing for more general system resources. In contrast to prior art embedded processor systems, the invention uses a pipelined architecture with a single processor/functional control unit wherein instructions take multiple processor cycles to execute and one instruction from an individual stream is typically executed each processor cycle. Unlike prior art systems, the invention provides a simple platform for sampling, supervising and controlling the execution of multiple program threads within a pipeline processor not through specialized hardware and memory registers but through any of the pipeline processor threads. This supervisory control function can also incorporate a hardware semaphore mechanism to control access to a set of program-defined resources including memory, registers and peripheral devices.

Multiple program threads are executed in parallel using a pipelined architecture and shared processor logic. By using a pipelined architecture the stages of fetching, decoding, processing, memory and peripheral accesses and storing machine instructions are separated and parallel program threads are introduced in a staggered fashion into the pipeline. At anytime during pipeline execution, each separate thread machine instruction is at a different stage in the pipeline so that within any cycle of the processor, logical operations for "n" such threads are processed concurrently. Although eight clock cycles can process a single machine instruction (sixteen for two-word instructions) in a preferred embodiment of the invention, the efficiencies of the invention provide additional processing with eight threads. For one-word instructions, one complete machine instruction is completed per clock cycle from one of the active threads. The invention provides significant processing gain and supervisory functions using less than 100,000 transistors instead of the tens of millions of transistors found in non-embedded microprocessors.

Figure 1:
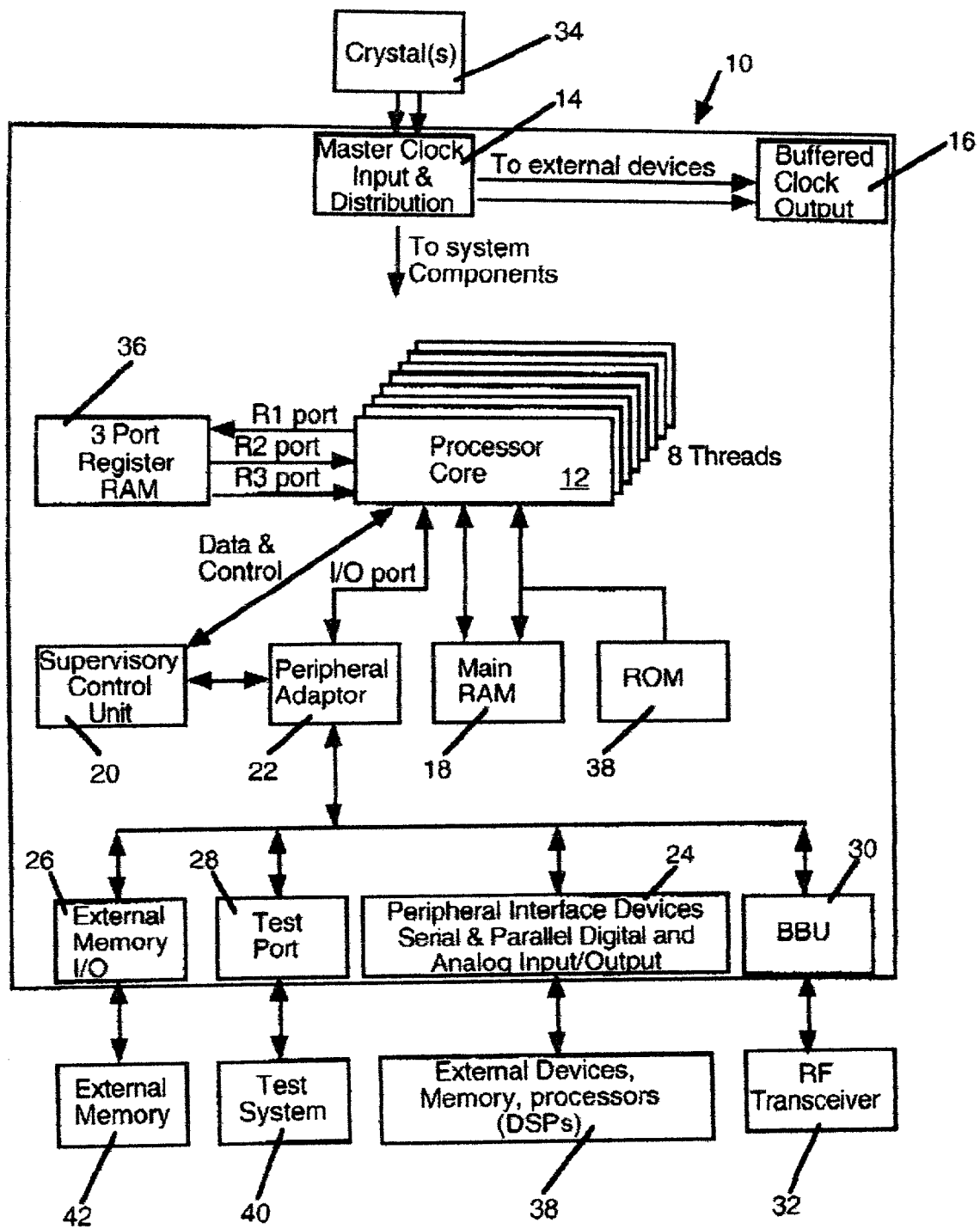
FIG. 1 illustrates a schematic view of a multithread processor for embedded applications.

Referring to FIG. 1, single-chip embedded processor 10 has input/output capabilities comprising a central eight-thread processor core 12, clock input 14 with buffered output 16, various internal memory components shown as main RAM 18, a supervisory control unit (SCU) 20, peripheral adaptor 22 peripheral interface devices 24, an external memory interface 26 and a test port 28. The system is used for various embedded input/output applications such as basebaud processor unit ("BBU") 30 connected to a RF transceiver 32 for communications applications and as an embedded device controller.

As shown in FIG. 1 the system, as implemented as an application specific integrated circuit (ASIC), is contained within a box identified as processor 10. The central component in the processor 10 is multithread processor core 12 and is illustrated as an eight-stage pipeline capable of executing eight concurrent program threads in one preferred embodiment of the invention. All elements within processor 10 are synchronized to master clock 14 that receives its base timing signal from crystal 34. Master clock 14 is used internally for synchronizing system components and is also buffered externally as a potential clock output 16 to another system. A second clock input can be fed to buffered output 16 so that a system working with embedded processor 10 can have a different clock rate.

Connected to processor core 12 are various types of memory. A three port register RAM module 36 comprising eight sets of eight words is used for registers R0 to R7 for each of the eight processor threads. A boot ROM memory 38 can store several non-volatile programs and data including the system boot image and various application specific tables such as a code table for RF transceiver 32 applications. When the system starts up the boot ROM 38 image is copied into main RAM 18 for execution. Temporary variables and other modifiable parameters and system data are also stored in main RAM 18. Main RAM 18 can be structured in a two port format. If additional memory is required, external memory 42 can be accessed through peripheral adaptor 22 using input/output instructions.

Supervisory control unit (SCU) 20 can be configured as a special purpose peripheral to work integrally with processor core 12 through peripheral adaptor 22. A "controlling" thread in processor core 12 issues input/output instructions to access supervisory control unit 20 by peripheral adaptor 22. Any of the processor threads can function as the controlling thread. Supervisory control unit 20 accesses various elements of processor core 12 as supervisory control unit 20 performs supervisory control functions. Supervisory control unit 20 supports various supervisory control functions including: 1) a run/stop control for each processor thread, 2) read/write access to the private state of each processor thread, 3) detection of unusual conditions such as I/O lock ups, tight loops, 4) semaphore-based management of critical resources, and 5) a sixteen-bit timer facility, referenced to master clock 14 for timing processor events or sequences.

During normal processing supervisory control unit 20 reads state information from the processor pipeline without impacting program thread processing. Supervisory control unit 20 will only interrupt or redirect the execution of a program for a given thread when directed to by a controlling thread.

Supervisory control unit 20 manages access to system resources through a sixteen bit semaphore vector. Each bit of the semaphore controls access to a system resource such as a memory location or range or a peripheral address, a complete peripheral, or a group of peripherals. The meaning of each bit is defined by the programmer in constants set in the ROM 38 image. ROM 38 may be of FLASH type or ROM 38 may access this information from an external memory, thus allowing the meaning of the bits of the semaphore vector to change depending on the application. A thread reserves a given system resource by setting the corresponding bit to "1". Once a thread has completed using a system resource it sets the corresponding bit back to "0". Semaphore bits are set and cleared using the "Up Vector" register 109 and "Down Vector" register 110 shown in FIG. 5.

Peripheral adaptor 22 accesses various generic input/output interface devices 24 which can include general purpose serial interfaces, general purpose parallel digital input/output interfaces, analog-to-digital converters, digital-to-analog converters, a special purpose baseband unit (BBU) 30, and test port 28. Baseband unit 30 is used for communications applications where control signals and raw serial data are passed to and from RF transceiver 32. Baseband unit 30 synchronizes these communications and converts the stream to and from serial (to RF transceiver 32) to parallel format (used by processor core 12). Test port 28 is used for development purposes and manufacturing testing. Test port 28 is supported by a program thread running on processor core 12 that performs various testing functions such as starting and stopping threads using supervisory control unit 20.

The ASIC supports a multithread architecture with a shared memory model. The programming model for processor core 12 is equivalent to a symmetric multiprocessor (SMP) with eight threads, however the hardware complexity is comparable to that of a single conventional microprocessor with input/output functions. Only the register set is replicated between threads. Most of the hardware cost for processor core 12 is shared by all eight threads.

Figure 2:
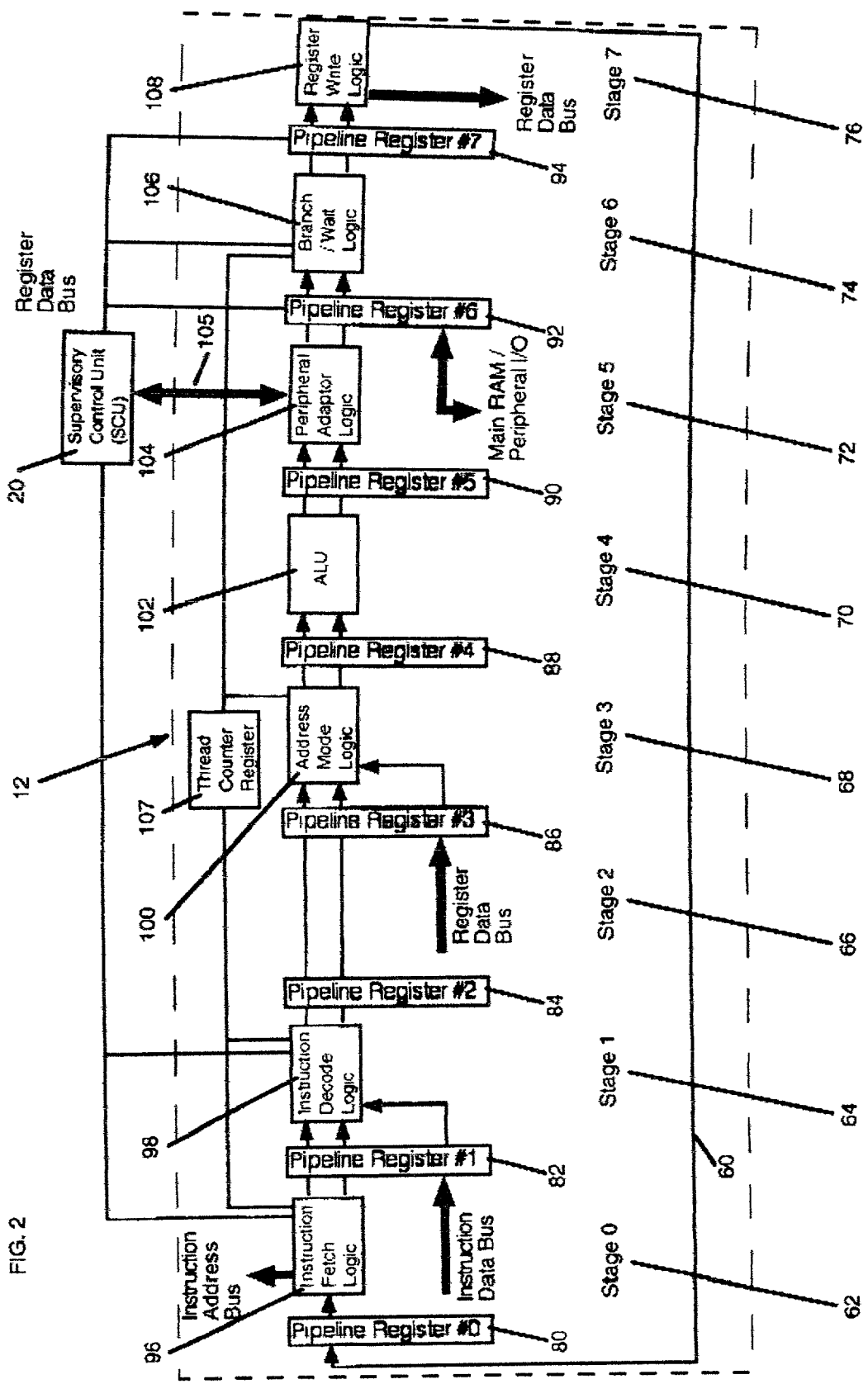
FIG. 2 illustrates a block diagram showing processing for up to eight stages.

Processor core 12, shown in FIG. 2, employs synchronous pipelining techniques known in the art to eftficiently process multiple program threads concurrently. In one embodiment of the invention as illustrated, a typical single sixteen-bit instruction is executed in an eight-stage process. Where instructions consist of two sixteen-bit words, two passes through the pipeline stage are typically required. The eight stages of the pipeline include:

| | |
|---|---|
| Stage 0 | Instruction Fetch |
| Stage 1 | Instruction Decode |
| Stage 2 | Register Reads |
| Stage 3 | Address Modes |
| Stage 4 | ALU Operation |
| Stage 5 | Memory or I/O Cycle |
| Stage 6 | Branch/Wait |
| Stage 7 | Register Write |

Figures 3, 4:
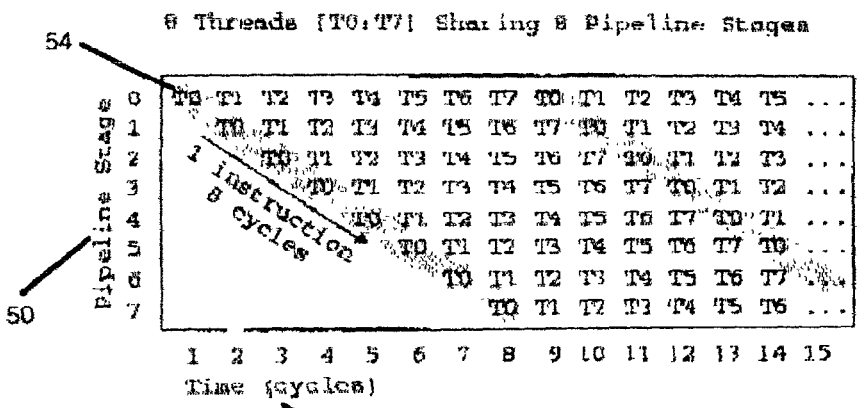
FIG. 3 illustrates a chart showing progression of threads through a processor pipeline.
FIG. 4 illustrates potential operating characteristics of a thread processor.

There are several significant advantages to this pipelining approach. First, instruction processing is broken into simple, energy-efficient steps. Second, pipelined processing stages can be shared by multiple processor threads. Each processor thread is executing in parallel but at different stages in the pipeline process as shown in FIG. 3. The vertical axis 50 in FIG. 3 denotes the pipeline stage and the horizontal axis 52 corresponds to the processor clock 14 cycles or time. Although each instruction per program thread takes eight clock cycles to execute, on average the pipeline completes one instruction per clock cycle from one of the executing eight threads. Accordingly, the pipelined architecture provides significant processing gain. Third, since each of the pipelined program threads can be executed independently, real-time critical tasks can be dedicated to separate program threads to ensure their reliable execution. This feature of the invention is much simpler and more reliable than traditional interrupt-driven microprocessors where complex division of clock cycles between competing tasks is difficult to prove and implement reliably.

On each cycle of processor clock 14 the active instruction advances to the next stage. Following Stage 7, the next instruction in sequence begins with Stage 0. As seen in FIG. 3, program thread 0 (T0) enters the pipeline Stage 0 in cycle "1" as shown by 54. As time progresses through the clock cycles, program thread T0 moves through Stages 0 to Stages 7 of the pipeline. Similarly, other program threads T1 to T7 enter the pipeline Stage 0 in subsequent cycles "1" to cycles "8" and move through Stages 0 to Stages 7 as shown in FIG. 3 as program thread T0 vacates a particular Stage. The result of this hardware sharing regime is equivalent to eight thread processors operating concurrently.

The processor core 12 pipeline supports thirty-two bit instructions such as two-word instruction formats. Each word of an instruction passes through all eight pipeline stages so that a two-word instruction requires sixteen clock ticks to process. This is seen in FIG. 2, where a line 60 joins the Register Write Logic 108 in Stage 7 (76) of the pipeline to the Pipeline Register #0 (80)in Stage 0 (62). In general, each thread processes one word of instruction stream per eight ticks of processor clock 14.

The private state of each processor thread of processor core 12, as stored in the pipeline registers #0 to #7 (80 to 94) or the three-port RAM 36 module (registers 0 to 7, R0:R7 ), consists of the following: 1) a sixteen-bit program counter (PC) register; 2) a four-bit condition code (CC) register, with bits named n, z, v, and c; 3) a set of eight sixteen-bit general purpose registers (R0:R7); and 4) flags, buffers and temporary registers as required at each pipeline stage. Physically the general purpose registers can be implemented as a sixty-four-word block in three-port RAM module 36 as seen in FIG. 1. Register addresses are formed by the concatenation of the three-bit thread number (T0:T7) derived from the thread counter register, together with a three-bit register specifier (R0:R7) from the instruction word. A single sixteen-bit instruction can specify up to three register operands.

As an instruction progresses through the hardware pipeline shown in FIG. 2, the private state of each processor thread is stored in a packet structure which flows through the processor pipeline, and where the registers (R0:R7) are stored in the three-port, sixty-four-word register RAM 36 and the other private values are stored in the Pipeline Registers #0 to #7 (80 to 94). The thread packet structure is different for each pipeline stage, reflecting the differing requirements of the stages. The size of the thread packet varies from forty-five bits to one hundred and three bits.

As seen in FIG. 4, on each tick of processor clock 14, two sixteen bit registers are read and one sixteen bit register may be written (56). Since the reads are performed in Stage 2

(66), whereas the optional write is performed in Stage 7 (76), the reads always pertain to a different thread than the write. Because the register subset for each thread is distinct, there is no possibility of collision between the write access and the two read accesses within a single clock tick.

Similarly all eight processor threads have shared access to main RAM 18 and to the full peripheral set. Generally speaking processor threads communicate with one another through main RAM 18, although a given processor thread can determine the state of and change the state of another processor thread using supervisory control unit 20. In Stage 0 (62) and Stage 5 (72) the two-port main RAM 18 is accessed by two different threads executing programs in different areas in main RAM 18 as shown by 58 in FIG. 4.

Referring to FIG. 2, which illustrates the pipeline mechanism, the various pipeline stages and supervisory control unit 20 and thread counter 107 inter-working with core processor 12 pipeline is shown. The thread counter 107 directs the loading of a particular processor thread's state information into Stage 0 (62) of the pipeline and counts from 0 to 7 continuously. An instruction for a particular processor thread, as directed by the thread counter 107, enters the pipeline through Pipeline Register #0 (80) at the beginning of Stage 0 (62). The Instruction Fetch Logic 96 accesses main RAM 18 address bus and the resultant instruction data is stored in Pipeline Register #1 (82). In Stage 1 (64) the instruction is decoded. In Stage 2 (66) this information is used to retrieve data from the registers associated with the given thread currently active in this stage. In Stage 3 (68) Address Mode Logic 100 determines the addressing type and performs addressing unifications (collecting addressing fields for immediate, base displacement, register indirect and absolute addressing formats for various machine instruction types). In stage 4 (70), containing the ALU 102 and associated logic, the ALU 102 performs operations (for address or arithmetic adds), sets early condition codes, and prepares for memory and peripheral I/O operations of Stage 5 (72).

For branches and memory operations, the ALU 102 performs address arithmetic, either PC relative or base displacement. Stage 5 (72) accesses main RAM 18 or peripherals (through the Peripheral Adaptor Logic 104) to perform read or write operations. Stage 6 (74) uses the Branch/Wait logic 106 to execute branch instructions and peripheral I/O waits. In some circumstances, a first thread will wait for a peripheral device 24 to respond for numerous cycles. This "waiting" can be detected by a second thread that accesses the appropriate supervisory control unit 20 register. The second thread can also utilize the supervisory control unit 20 register timer which is continuously counting to determine the duration of the wait. If a peripheral device 24 does not respond within a given period of time, the second thread can take actions to re-initialize the first thread as it may be stuck in a wait loop. Stage 7 (76) writes any register values to three port register RAM module 36. The balance of the thread packet is then copied to Pipeline Register #0 (80) for the next instruction word entering the pipeline for the current thread.

FIG. 2 also shows supervisory control unit 20 used to monitor the state of the processor core threads, control access to system resources, and in certain circumstances to control the operation of threads. Supervisory control unit 20 can selectively read or write state information at various points in the pipeline hardware as illustrated in FIG. 2. It is not a specialized control mechanism that is operated by separate control programs but is integrally and flexibly controlled by any of the threads of processor core 12. Supervisory control unit 20 is configured as a peripheral so it is accessible by any thread using standard input/output instructions through the peripheral adaptor logic 104 as indicated by the thick arrow 105 in FIG. 2. The formats of these instructions "inp" and "outp" are described later. When a given thread wishes to direct a thread-specific supervisory control unit 20 operation, it must first write a pointer value to input/output address "4" (112) as is shown in FIG. 5. The pointer 112 contains the thread being accessed by supervisory control unit 20 in bit locations "3" to "5" (114) as shown in FIG. 6. If a register is accessed through a supervisory control unit 20 operation, the value of the desired register is contained in bits "0" to "2" (116) of the pointer.

Various supervisory control unit 20 read and write operations are supported. Read accesses ("inp" instruction) have no effect on the state of the processor thread being read. As shown in FIG. 5, register values (R0:R7), program counter values, condition code values, a breakpoint (tight loop in which a thread branches to itself) condition for a given thread, a wait state (thread waiting for a peripheral to respond) for a given thread, a semaphore vector value and a continuously running sixteen-bit counter can be read. The "breakpoint" register 124 detects if a thread is branching to itself continuously. The "wait" register 126 tells if a given processor thread is waiting for a peripheral, such as when a value is not immediately available. The "time" register 130 is used by a thread to calculate relative elapsed time for any purpose such as measuring the response time of a peripheral in terms of the number of system clock cycles. By convention a given target thread should be "stopped" before any write access ("outp" instruction) is performed on its state values. If a controlling thread desires to change a register, program counter or condition code for a given target thread, the controlling thread must first "stop" the target thread by writing a word to stop address "3" (132) as seen in FIG. 5. Bit "0" to bit "7" of the stop vector correspond to the eight threads of processor core 12. By setting the bit corresponding to the target thread to one, this causes the target thread to complete its current instruction execution through the pipeline. The pipeline logic then does not load any further instructions for that thread until the target thread's bit in the stop vector is once again set to zero by the controlling thread, such as in a "run" operation. Once the target thread is stopped the controlling thread can then write to any register value (138), the program counter (136) or the condition codes (134) of the target thread by performing a write ("outp" instruction) to the appropriate supervisory control unit 20 input/output address location as shown in FIG. 5. This feature is useful in reconfiguring processor core 12 to perform in various SIMD and MIMD configurations (described later) or in otherwise modifying the target threads execution flow.

Also shown in the "write" column of FIG. 5, the Up Vector 109 and the Down Vector 110 are used to respectively reserve and free up resources using the supervisory control unit's hardware semaphore. The value of the semaphore can be read at any time by a given thread (address 5, Semaphore Vector 128) to see what system resources have been locked by another thread. Each thread is responsible for unlocking a given resource using the Down Vector register 110 when it is done with that resource.

Processor core 12 supports a set of programming instructions also referred to as "machine language" or "machine instructions", to direct various processing operations. This instruction set is closely tied to a condition code mechanism. The processor core 12 machine language consists of eighteen instructions as shown in FIG. 8 and a total of six address modes shown in FIG. 7. Machine instructions are either one or two words in size. Two word instructions must pass through the pipeline twice to complete their execution one word-part at a time. The table shown in FIG. 7 describes the six address modes 140, provides a symbolic description 142, and gives the instruction formats 143 to which they apply by instruction size. Results written to a register by one instruction are available as source operands to a subsequent instruction. The machine language instructions of the invention can be used in combination to construct higher-level operations. For example, the bitwise rotate left instruction, combined with the bit clear instruction, gives a shift left operation where bits are discarded as they are shifted past the most significant bit position.

A series of conventions can be used to describe the machine instruction set and related processor registers. R0 . . . R7 are defined as register "0" to register "7" respectively. "Rn" is used to refer to registers in general, and "rn" is used for a particular register instance. "PC" is the program counter. "CC" is a condition code register. "K" refers to a literal constant value. For one word instruction formats, the precision of "K" is limited to between four and eight bits. For the two word instruction formats, "K" is specified by sixteen bits such as the second word of the instruction. "T" is a temporary register. "*" is a pointer to a value in memory. "&" is an AND logical operation. "|" is an OR logical operation. "^" is an exclusive OR logical operation. "!" is a NOT logical operation. "<<" is a shift left operation. A separate register set, program counter and condition code register is kept for each system thread. The "n", "z", "v" and "c" bits of the condition code ("CC") register have different interpretations, depending on the instruction that produced them. For arithmetic operations, add and subtract, the CC bits respectively mean negative, zero, overflow, and carry. For other operations, the "c" bit means character such as the result in an interval 1 to 255. The "v" bit has varying interpretations, usually indicating that the result is odd. Details of the instruction set are shown later. "msb" is an abbreviation for most significant bit. "lsb" is an abbreviation for least significant bit, or bit 0 when the word is read from right to left.

The get thread number instruction "thrd" 146 as shown in FIG. 8 and later described is an important feature of the invention. The "thrd" instruction 146 is used by a given program thread to determine its identity or assigned processor thread number. FIG. 9 illustrates an example of how this instruction, in combination with supervisory control unit 12 control registers, can operate processor core 12 in SIMD and then in MIMD configurations or vice versa. Such a capability can be used at any point during operation of processor core 12 to flexibly configure all or part of the processor threads in either SIMD or MIMD configurations or modes. When processor core 12 starts up from the power up state, the eight program threads supported by processor core 12 do not know their assigned processor thread numbers. In the example, shown in FIG. 9, processor core 12 uses all eight processor threads in parallel to initialize 16 k words of Main RAM 18 memory to zero. Thread zero then stops all other processor threads, reinitializes the program counter and register zero of the other processor threads and restarts them so that they begin executing eight independent programs on independent sets of data such as in MIMD operation. At the top of the example constants 150, corresponding to supervisory control unit 20 registers, are initialized. In section "Initialize Threads" 152 at the beginning of concurrent multithread operation, each program thread is sequentially loaded into the pipeline starting from processor thread zero. The "thrd" instruction 146 is used by each program thread to determine its corresponding processor thread number. Register two (r2) for each processor thread is also set to zero. In the section "InitMemory" 154 each processor thread stores zero to the address located in their register zero (r0) and then increments the memory location address by eight words. This is preferred to coordinate eight threads concurrently writing to a sequential memory block of eight words. When 16 k words of main RAM 18 memory are initialized, the program exits from "InitMemory" 154. In "StopThreads" 156, program thread zero writes to the supervisory control unit 12 stop register 132. This writes a zero to the bit corresponding to thread zero. Ones are written to the other threads. This causes the execution of all other threads except thread zero to halt once the current instruction in the pipeline is completed. In sections "InitForMIMD" 158 and "SetMIMD" 160, thread zero initializes the program counters of the stopped threads, one to seven, to correspond to the beginning of the "MIMDStart" section 162 and initializes the register zero of each thread to contain a value corresponding to separate independent program segments at different memory addresses. The address of a given instruction is shown in the left-most column 151 of FIG. 9. From this column 151 we see that the MIMDStart section 162 starts at address 23. At the end of the "SetMIMD" section 160, thread zero starts the stopped threads one to seven by changing the value of supervisory control unit 20 stop vector 132. All threads then begin executing at the beginning of section "MIMDStart" 162 and based upon their different register zero values, branch to independent program segments where they operate independently. The program segment thus shows how the "thrd" instruction 146 and supervisory control unit 20 stop/run function can be used to configure processor core 12 threads for MIMD and SIMD modes of operation. Processor threads in processor core 12 may operate in a mixed mode where some threads are executing in a SIMD configuration and others are operating in a MIMD configuration.

Another embodiment of the invention uses "don't care" fields in the "bra" unconditional branch and "jsr" jump to subroutine instructions shown later to embed identification bit information into assembled machine instructions. Such "don't care" fields can also be embedded in other instructions within the instruction set. Don't care fields can be used for embedding system or assembler version information or for copy protection purposes. As these instructions are assembled (converted from a textual representation to a machine readable format) by the machine assembler for the processor core, a version related or copyrighted protection bit pattern can be selectively distributed across multiple occurrences of these instructions to mark the code. For example if the "bra" instruction and the "jsr" instruction were in a sequence of machine instructions, the "bra" instruction could store three identification bits and the "jsr" instruction could store two identification bits. Thus for a 5 bit long bit sequence "10110", "101" could be stored in the assembled "bra" instruction and "10" could be stored in the assembled "jsr" instruction. By examining the machine bit patterns generated for these instructions, it can be determined that the machine bit representation was generated by an authorized assembler and potentially version information relating to the assembler or the system can be utilized for version control or other related purposes.

The stop/run feature of supervisory control unit 20 is useful not just for reconfiguring the operating mode of the system threads but also for debug purposes. Using test port 28 operated by a debug thread application running on a given processor thread, an external test system 40 can step other system threads through their machine instructions one instruction at a time and examine the state of these other threads at each instruction step. The debug thread runs and stops other threads by alternately setting supervisory control unit 20 stop register 132 bits to zero and then one for the threads currently being targeted for debugging. Any instructions currently in the processor core pipeline are first completed before a stop control takes effect, which allows single step control for both single and double word instructions and multiple step operation for sets of instructions.

The "c" condition code efficiently detects words having a value of "1" to "255". One application of this feature is the detection of one-byte data types such as characters. Such detection can be done without expending additional machine cycles for value testing.

Although the system supports four or more (eight illustrated) concurrent threads in one embodiment of the invention the system can be extended. Additional instructions can be implemented to support functions more directly. The number of concurrent threads controllable by supervisory control unit 12 can be increased up to sixteen threads without losing the capability of starting and stopping all sixteen threads in one machine cycle. The system can also be configured to operate with longer word widths by adjusting the basic data processing size e.g. from 16 bit words to 32 or longer bit units. By adjusting the main RAM 18 access for multi-word simultaneous accesses, providing a sufficiently wide data bus and adjusting the processor logic to handle multiword instructions, 2 word or longer instructions can be fetched within a single machine cycle and the pipeline can process two or more word long instructions in 8 clock cycles versus 16 clock cycles. To increase processing capacity, several of such systems could be run in parallel, each with their own private memory or with memory access controlled by a semaphore.

Representative machine instructions can be described as follows:

R1 . . . R3 represent any of the registers r0 to r7. The lower case representation is used for actual machine instructions.

Instruction: "add"-2's Complement Add

Format 1 - register: R1=R2+R3

| 0 0 | R1 | 0 1 1 0 0 | R3 | R2 |

Format 2 - immediate K3= [−128:127] : R1=R2+K3

| 0 | 1 | R1 | R2 | K3 |

Format 3 - immediate: R1=R2+K3

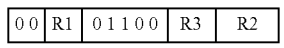

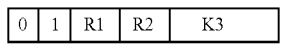

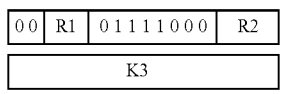

Instruction Fields:

R1    3-bit specifier for destination register
    R2    3-bit specifier for source register
    R3    3-bit specifier for source register
    K3    signed 8-bit or 16-bit literal source Condition Codes:

n    Set if result is negative, i.e. msb is 1
    z    Set if result is zero
    v    Set if an overflow is generated
    c    Set if a carry is generated Description:

Add the source operands and write the result to the destination register R1.

Example Instructions:

add r1, r2, r3 (format 1)
    add r1, r2, 9 (formats 2 and 3)

Instruction: "and" - Bitwise And

Format 1 - register: R1=R2&R3

| 0 0 | R1 | 1 0 1 0 1 | R3 | R2 |

Format 2 - immediate: R1=R2&K3

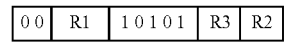

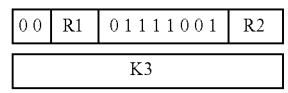

Instruction Fields:

R1    3-bit specifier for destination register
    R2    3-bit specifier for source register
    R3    3-bit specifier for source register
    K3    16-bit literal source Condition Codes:

n    Set if result is negative, i.e. msb is 1
    z    Set if result is zero
    v    Set if (R2 | R3) != R3, or alternatively if (R2 | K3) !=K3
    c    Set if result is in the interval [1:255]

Description:

Bitwise-and the source operands and write the result to the destination register R1.

Example Instructions:

and r1, r2, r3 (format 1)
    and r1, r2, 0x0F (format 2)

Instruction: "bc" - Conditional Branch

Format 1 - PC relative K2 = [−128:127] : if (condition(C1)) PC=PC+K2

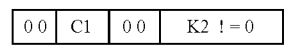

Format 2 - PC relative: if (condition(C1)) PC=PC+K2

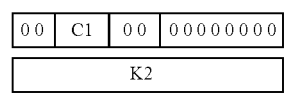

Instruction Fields:

C1    4-bit specifier for branch condition
    K2    signed 8-bit or 16-bit literal source Condition Codes:

| C1 Value | Condition (C1) | Test | Signed Comparison | Unsigned Comparison |
|---|---|---|---|---|
| 0x0 | c | | | < |
| 0x1 | v | | | |
| 0x2 | z | ==0 | == | == |
| 0x3 | n | <0 | | |
| 0x4 | c \| z | | | <= |

-continued

| | | | | |
|---|---|---|---|---|
| 0x5 | n ^ v | < | | |
| 0x6 | (n ^ v) \| z | <= | | |
| 0x7 | n \| z | <=0 | | |
| 0x8 | !c | | >= | |
| 0x9 | !v | | | |
| 0xA | !z | !=0 | != | != |
| 0xB | !n | >=0 | | |
| 0xC | !(c \| z) | | > | |
| 0xD | !(n ^ v) | >= | | |
| 0xE | ! | | > | |
| 0xF | !(n \| z) | >0 | | |

Description:

Evaluate the specified branch condition (C1) using the n, z, v, and c bits of the condition code (CC) register (see condition code table for values). If the specified branch condition is met, add the source operand to the program counter (PC) register. Otherwise the program counter is not affected.

Example Instruction:

bc    0x2, loopback (format 1 & 2)

Instruction: "bic" - Bit Clear
Format 1 - immediate K3= [0:15] : R1=R2 & ~(1<<K3)

| 0 0 | R1 | 1 1 0 1 | K3 | R2 |
|---|---|---|---|---|

Instruction Fields:

R1    3-bit specifier for destination register
R2    3-bit specifier for source register
K3    4-bit literal source Condition Codes:

n    Set if result is negative, i.e. msb is 1
z    Set if result is zero
v    Set if the selected bit was 1 when it was tested
c    Set if result is in the interval [1:255]

Description:

Select a single bit of the source operand R2 using the immediate operand K3, test the selected bit, clear the selected bit, and write the result to the destination register R1. The bits of R2 are numbered 15:0, with bit 0 the least significant bit.

Example Instruction:

bic    r1, r2, 3 (format 1)

Instruction: "bis" - Bit Set
Format 1 - immediate K3=[0:15] : R1=R2 | (1<<K3)

| 0 0 | R1 | 1 1 1 0 | K3 | R2 |
|---|---|---|---|---|

Instruction Fields:

R1    3-bit specifier for destination register
R2    3-bit specifier for source register
K3    4-bit literal source Condition Codes:

n    Set if result is negative, i.e. msb is 1
z    Set if result is zero
v    Set if the selected bit was 1 when it was tested
c    Set if result is in the interval [1:255]

Description:

Select a single bit of the source operand R2 using the immediate operand K3, test the selected bit, set the selected bit, and write the result to the destination register R1. The bits of R2 are numbered 15:0, with bit 0 the least significant bit.

Example Instruction:

bis    r1, r2, 3 (format 1)

Instruction: "bix" - Bit Change
Format 1 - immediate K3=[0:15] : R1=R2 ^ (1<<K3)

| 0 0 | R1 | 1 1 1 1 | K3 | R2 |
|---|---|---|---|---|

Instruction Fields:

R1    3-bit specifier for destination register
R2    3-bit specifier for source register
K3    4-bit literal source Condition Codes:

n    Set if result is negative, i.e. msb is 1
z    Set if result is zero
v    Set if the selected bit was 1 when it was tested
c    Set if result is in the interval [1:255]

Description:

Select a single bit of the source operand R2 using the immediate operand K3, test the selected bit, change the selected bit, and write the result to the destination register R1. The bits of R2 are numbered 15:0, with bit 0 the least significant bit.

Example Instruction:

bix    r1, r2, 3 (format 1)

Instruction: "bra" - Unconditional Branch
Format 1 - PC relative K1=[−128:127] : PC=PC+K1

| 0 0 | X X X | 0 0 1 | K1 != 0 |
|---|---|---|---|

Format 2 - PC relative: PC=PC+K1

| 0 0 | X X X | 0 0 1 | 0 0 0 0 0 0 0 0 |
|---|---|---|---|

| K1 |
|---|

Instruction Fields:

K1    signed 8-bit or 16-bit literal source

Condition Codes:

Not affected

Description:

Add the source operand to the program counter (PC) register. "X" is don't care.

Example Instruction:

bra    branchstart1 (format 1 & 2)

Instruction: "inp" - Read Input Port of Peripheral
Format 1 - immediate K2=[0:127] : PC=PC+K1

| 0 0 | R1 | 0 1 0 0 | K2 |
|---|---|---|---|

Instruction Fields:

R1    3-bit specifier for destination register
K2    unsigned 7-bit literal source Condition Codes:

n    Set if result is negative, i.e. msb is 1
z    Set if result is zero
v    Set if result is odd, i.e. lsb is 1
c    Set if result is in the interval [1:255]

Description:

Read the input port at I/O address K2 and write the result to the destination register R1.

Example Instruction:

inp    r1, 0x00 (format 1)

Instruction: "ior" - Bitwise Inclusive Or
Format 1 - register: R1=R2|R3

Format 2 - immediate: R1=R2|K3

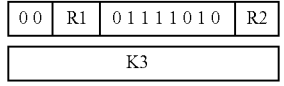

Instruction Fields:

R1    3-bit specifier for destination register
    R2    3-bit specifier for source register
    R3    3-bit specifier for source register
    K3    16-bit literal source Condition Codes:

n    Set if result is negative, i.e. msb is 1
    z    Set if result is zero
    v    Set if (R2 & R3) == R3, or alternatively if (R2 & K3) == K3
    c    Set if result is in the interval [1:255]

Description:

Bitwise-inclusive-or the source operands and write the result to the destination register R1.

Example Instructions:

ior    r1, r2, r3 (format 1)
    ior    r1, r2, 0x1F (format 2)

Instruction: "jsr" - Jump to Subroutine
Format 1 - register indirect with temporary T: T=R2; R1=PC; PC=T

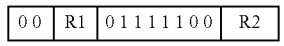

Format 2 - absolute: T=K2; R1=PC; PC=T

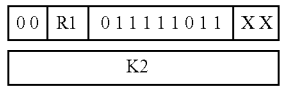

Instruction Fields:

R1    3-bit specifier for destination register
    R2    3-bit specifier for source register
    K2    16-bit literal source Condition Codes:

Not affected

Description:

Save the source operand in a temporary T, write the program counter (PC) to the destination register R1, and write the temporary T to the program counter (PC) register. "X" is don't care.

Example Instructions:

jsr    r1, r2 (format 1)
    jsr    r1, go_ahead (format 2)

Instruction: "ld" - Load from RAM
Format 1 - base displacement absolute indexed, K3=[−128:127]: R1=* (R2+K3)

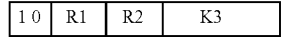

Format 2 - base displacement absolute indexed: R1=* (R2+K3)

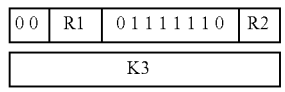

Format 3 - absolute: R1=*K2

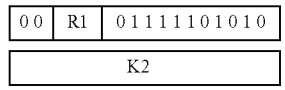

Instruction Fields:

R1    3-bit specifier for destination register
    R2    3-bit specifier for base register
    K3    signed 8-bit or 16-bit displacement
    K2    16-bit absolute address Condition Codes:

n    Set if result is negative, i.e. msb is 1
    z    Set if result is zero
    v    Set if result is odd, i.e. lsb is 1
    c    Set if result is in the interval [1:255]

Description:

For formats 1 and 2, add the base register R2 and the displacement K3 to form the address of the RAM source. For format 3, K2 is the address of the RAM source. Read the RAM source and write the result to the destination register R1. Note that absolute indexed is a synonym for base displacement.

Example Instructions:

ld    r1, r2, 0x1F (formats 1 & 2)
    ld    r1, 0x2F (format 3)

Instruction: "mov" - Move Immediate
Format 1 - immediate, K2=[−32:31] : R1=K2

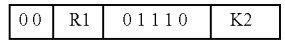

Format 2 - immediate: R1=K2

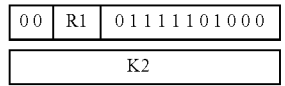

Instruction Fields:

R1    3-bit specifier for destination register
    K2    signed 6-bit or 16-bit literal source Condition Codes:

Not affected

Description:

Write the source value K2 to the destination register R1.

Example Instruction:

mov    r1, 1 (formats 1 & 2)

Instruction: "outp" - Write Output Port of Peripheral
Format 1 - immediate, K2=[0:127] : outp(R1,K2)

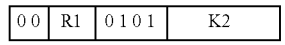

Instruction Fields:

R1    3-bit specifier for source register
K2    unsigned 7-bit literal source

Condition Codes:

Not affected

Description:

Read the source operand R1 and write the result to the output port at I/O address K2.

Example Instruction:

outp    r1, SCUpc (format 1)

Instruction: "rol" - Bitwise Rotate Left

Format 1 - register: R1=R2<<R3

| 0 0 | R1 | 1 0 1 0 0 | R3 | R2 |
|---|---|---|---|---|

Format 2 - immediate, K3=[0:15] : R1=R2<<K3

| 0 0 | R1 | 1 1 0 0 | K3 | R2 |
|---|---|---|---|---|

Instruction Fields:

R1    3-bit specifier for destination register
R2    3-bit specifier for source register
R3    3-bit specifier for source register
K3    4-bit literal source Condition Codes:

n    Set if result is negative, i.e. msb is 1
z    Set if result is zero
v    Set if result is odd, i.e. lsb is 1
c    Set if result is in the interval [1:255]

Description:

Bitwise-rotate the source operand R2 left n positions and write the result to the destination register R1. The amount n of the rotation is given by either R3 or K3, modulo 16.

Example Instructions:

rol    r1, r2, r3 (format 1)
    rol    r1, r2, 5 (format 2)

Instruction: "st" - Store to RAM

Format 1 - base displacement absolute indexed, K3=[−128:127] : *(R2+K3) =R1

| 1 1 | R1 | R2 | K3 |
|---|---|---|---|

Format 2 - base displacement absolute indexed: *(R2+K3) =R1

| 0 0 | R1 | 0 1 1 1 1 1 1 1 | R2 |
|---|---|---|---|
| K3 | | | |

Format 3 - absolute: *K2=R1

| 0 0 | R1 | 0 1 1 1 1 1 0 1 0 1 1 |
|---|---|---|
| K2 | | |

Instruction Fields:

R1    3-bit specifier for source register
R2    3-bit specifier for base register
K3    signed 8-bit or 16-bit displacement
K2    16-bit absolute address Condition Codes:

Not affected

Description:

For formats 1 and 2, add the base register R2 and the displacement K3 to form the address of the RAM destination. For format 3, K2 is the address of the RAM destination. Read the source register R1 and write the result to the RAM destination.

Example Instructions:

st    r1, r2, 0x11 (formats 1 & 2)
    st    r1, 0x1FFF (format 3)

Instruction: "sub" - 2's Complement Subtract

Format 1 - register: R1=R2−R3

| 0 0 | R1 | 0 1 1 0 1 | R3 | R2 |
|---|---|---|---|---|

Instruction Fields:

R1    3-bit specifier for destination register
R2    3-bit specifier for source register
R3    3-bit specifier for source register Condition Codes:

n    Set if result is negative, i.e. msb is 1
z    Set if result is zero
v    Set if an overflow is generated
c    Set if a carry is generated Description:

Subtract the source operands R2−R3 and write the result to the destination register R1.

Example Instructions:

sub    r1, r2, r3 (format 1)

Instruction: "thrd" - Get Thread Number

Format 1 - register: R1=thrd()

| 0 0 | R1 | 0 1 1 1 1 1 0 1 0 0 1 |
|---|---|---|

Instruction Fields:

R1    3-bit specifier for destination register

Condition Codes:

Not affected

Description:

Write the thread number to the destination register R1.

Example Instruction:

thrd    r1

Instruction: "xor" - Bitwise Exclusive Or

Format 1 - register: R1=R2^R3

| 0 0 | R1 | 1 0 1 1 1 | R3 | R2 |
|---|---|---|---|---|

Format 2 - immediate: R1=R2^K3

| 0 0 | R1 | 0 1 1 1 1 0 1 1 | R2 |
|---|---|---|---|
| K3 | | | |

Instruction Fields:

R1    3-bit specifier for destination register
R2    3-bit specifier for source register
R3    3-bit specifier for source register
K3    16-bit literal source -continued Condition Codes:

| | |
|---|---|
| n | Set if result is negative, i.e. msb is 1 |
| z | Set if result is zero |
| v | Set if (R2 & R3) == R3, or alternatively if (R2 & K3) == K3 |
| c | Set if result is in the interval [1:255] |

Description:

Bitwise-exclusive-or the source operands and write the result to the destination register R1.

Example Instructions:

```
xor    r1, r2, r3 (format 1)
xor    r1, r2, 0x100F (format 2)
```

The invention provides a unique design of a multithread processor core 12 supporting an innovative multiple stage pipeline that can be extended in various ways. The condition code mechanism introduces a powerful new character-detection mechanism that does not required additional value testing. The "thrd" instruction 146, allowing threads to determine their identity for various thread configuration, initialization and other thread related operations, provides a powerful tool for multithread control. Supervisory control unit 20, configured as a peripheral that is accessible by all processor core 12 threads, provides extremely flexible thread status checking and control operations and resource control using a hardware semaphore. In different applications individual threads may be configured to operate in SIMD or MIMD operation. Supervisory control unit 20 can also support powerful single and multiple step testing modes. These features provide a significant advancement in the state of the art for embedded microprocessor systems.

The parallel pipelined architecture of the invention is a significant technological advancement for embedded processor applications since it inherently performs parallel input/output tasks without the overhead of context switching and with the predictability of independent processor threads.

The hardware semaphore in the invention is used in combination with the capability to stop, reinitialize and restart multiple threads. This combination provides an exceedingly powerful mechanism to direct and restrict the operation of multiple concurrent threads competing for more general system resources.

The invention utilizes a more finely segmented multiple-stage pipeline than prior art systems. The pipeline enables the simultaneous execution of multiple threads by selectively avoiding memory or peripheral access conflicts through the types of pipeline stages chosen and the use of dual and tri-port memory techniques. The pipeline allows a finer level of result inspection and control per pipeline stage.

The invention can execute multiple instruction streams on multiple data streams or a single instruction stream on data streams in various combinations under the control of single or multiple threads as executed by a single pipelined processor core.

Although the invention has been described in terms of certain preferred embodiments, it will become apparent to those of ordinary skill in the art that modifications and improvements can be made to the ordinary scope of the inventive concepts herein within departing from the scope of the invention. The embodiments shown herein are merely illustrative of the inventive concepts and should not be interpreted as limiting the scope of the invention.

What is claimed is:

1. A programmable, single-chip embedded processor comprising:
(1) A multiple-bit, multithreaded processor core comprising a single processor pipeline have a 'k' number of pipeline stages shared by one or more independent processor threads, the number 'k' being equal to at least four, and a number 'n' of said processor threads being equal to or less than 'k';
(2) . . .
(3) A memory capable of storing data comprising instructions from said instruction set, said memory being internally integral to the embedded processor and comprising a main RAM and a boot ROM; and
(4) A peripheral adaptor internally integral to the embedded processor and engaged with said processor core for transmitting input/output signals to and from said processor core;
(5) . . .

2. The embedded processor as recited in claim 1, wherein said processor pipeline includes an instruction fetch logic stage, an instruction decode logic stage, a multiple port register read stage, an address mode logic stage, an arithmetic logic unit for arithmetic and address calculations stage, a multiple port memory stage, a branch/wait logic stage, and a multiple port register write stage.

3. The embedded processor as recited in claim 1, wherein said processor core supports one or more additional independent groups of at least two processor threads, each group of processor threads being associated with, an instruction execution logic mechanism and a memory.

4. The embedded processor as recited in claim 1, further comprising a condition code mechanism implemented in said instruction set for detecting specific word data types.

5. The embedded processor as recited in claim 4, wherein the value of the least significant byte of a word is detected to be within a specific range.

6. The embedded processor as recited in claim 1, wherein said instruction set includes a processor instruction for enabling individual program threads to identify the particular processor threads on which they are being executed.

7. The embedded processor as recited in claim 1, wherein said supervisory control unit is capable of examining, interpreting, and adjusting the state of the processor core for the purpose of starting and stopping individual processor threads, and modifying the state of each individual processor thread.

8. The embedded processor as recited in claim 7, further comprising a hardware semaphore vector engaged with said supervisory control unit for controlling multithread access to said peripheral adaptor and said memory.

9. The embedded processor as recited in claim 1, wherein said supervisory control unit is capable of being accessed and controlled by one or more controlling threads selected from the processor threads in the processor core, by using input/output instructions to control the operation of one or more processor threads.

10. The embedded processor as recited in claim 9, wherein said one or more controlling threads are programmable.

11. The embedded processor as recited in claim 9, wherein said one or more controlling threads are capable of reconfiguring the overall thread processing method of operation so that two or more processor threads can support MIMD operations.

12. The embedded processor as recited in claim 9, wherein said one or more controlling threads can reconfigure the overall thread processing method of operation so that two or more processor threads can support SIMD operations.

13. The embedded processor as recited in claim 9, wherein said one or more controlling threads are capable of reconfiguring the overall thread processing method of operation so that two or more processor threads can support simultaneously SIMD operations, and two or more processor threads can support MIMD operations.

14. The embedded processor as recited in claim 1, wherein said supervisory control unit is operable by a first processor thread to start and stop the operation of another processor thread and to examine and alter processor core state information in single-step and multiple-step modes of controlled operation.

15. The embedded processor as recited in claim 1, further comprising an identifying bit pattern embedded in said instruction set.

16. The embedded processor as recited in claim 15, wherein said identifying bit pattern is used to identify programming code for code protection purposes.

17. The embedded processor as recited in claim 15, wherein said identifying bit pattern does not affect the operation of the instruction execution logic mechanism.

18. The embedded processor as recited in claim 1, wherein said memory is expandable by addition of external memory accessible by the system through said peripheral adaptor.

19. The embedded processor as recited in claim 1, wherein said supervisory control unit is configured as a peripheral to said processor core.

20. The embedded processor as recited in claim 1, wherein said peripheral adaptor is capable of controlling analog and digital processing functions.

* * * * *

UNITED STATES PATENT AND TRADEMARK OFFICE
CERTIFICATE OF CORRECTION

PATENT NO.       : 7,320,065 B2
APPLICATION NO.  : 09/843178
DATED            : January 15, 2008
INVENTOR(S)      : Jason Gosior et al.

It is certified that error appears in the above-identified patent and that said Letters Patent is hereby corrected as shown below:

In column 20, delete text beginning at line 2 with "1. A programmable, single-chip" to and including "(5) . . ." at column 20, line 19, and insert therefor:

--1. A programmable, single-chip embedded processor comprising:
  (a) a multiple-bit, multithreaded processor core comprising a single processor pipeline having a 'k' number of pipeline stages shared by one or more independent processor threads, the number 'k' being equal to at least four, and a number 'n' of said processor threads being equal to or less than 'k';
  (b) an instruction execution logic mechanism engaged with said processor core for executing instructions from a built-in instruction set;
  (c) a supervisory control unit, controlled by one or more control threads selected from said processor threads, for examining the processor core state and for controlling the operation of said processor core, said supervisory control unit being adapted to allow the one or more control threads to set up the initial state of one or more other threads and to start and stop their operation;
  (d) a memory capable of storing data comprising instructions from said instruction set, said memory being internally integral to the embedded processor, and comprising a main RAM and a boot ROM; and
  (e) a peripheral adaptor internally integral to the embedded processor and engaged with said processor core for transmitting input/output signals to and from said processor core;
  wherein:
  (f) each of the 'n' program threads occupies a unique pipeline stage at any given time;
  (g) each program thread advances to the next pipeline stage with every clock cycle;
  (h) for a given program thread, the pipeline completes a one-word instruction every 'k' clock cycles;
  (i) a first selected program thread is adapted to wait for a specified number of clock cycles for a response from a designated peripheral device; and

UNITED STATES PATENT AND TRADEMARK OFFICE
CERTIFICATE OF CORRECTION

PATENT NO. : 7,320,065 B2
APPLICATION NO. : 09/843178
DATED : January 15, 2008
INVENTOR(S) : Jason Gosior et al.

It is certified that error appears in the above-identified patent and that said Letters Patent is hereby corrected as shown below:

(j) a second selected program thread is adapted to re-initialize said first selected program thread if the designated peripheral device does not respond within the specified number of clock cycles.--

Signed and Sealed this

Seventh Day of April, 2009

JOHN DOLL
*Acting Director of the United States Patent and Trademark Office*